Feb. 14, 1961 R. SINGER 2,972,023

APPARATUS FOR REPEATING THE LAST POSITION OF A MAGNETIC RECORDING

Filed Aug. 10, 1956 3 Sheets-Sheet 1

INVENTOR:
Rudolf Singer
BY: Michael S. Striker
Agt.

INVENTOR:
Rudolf Singer
BY: Michael S. Striker
Agt.

INVENTOR:
Rudolf Singer
BY: Michael S. Striker
Agt.

United States Patent Office 2,972,023

Patented Feb. 14, 1961

2,972,023

APPARATUS FOR REPEATING THE LAST POSITION OF A MAGNETIC RECORDING

Rudolf Singer, 110—05 71st Ave., Forest Hills, N.Y.

Filed Aug. 10, 1956, Ser. No. 603,372

3 Claims. (Cl. 179—100.2)

The present invention relates to a magnetic sound recording and reproducing apparatus and more particularly to an addition to a conventional recording apparatus by means of which the last part of the sound waves recorded can be played back without disturbing the setting of the medium of the conventional recording structure on which the sound recording is made.

When the user of recording machines of the common type interrupts his recording or dictation for any reason, he may not exactly recall the last part he dictated before the interruption, and he has to run, therefore, the tape or wire, on which the record is made, backwardly in order to be able to listen to the last part of the record made. This is not only time-consuming, but it is usually difficult to stop exactly at the end of the record already made.

It is an object of the present invention to avoid these difficulties of recording apparatus of the prior art.

It is a further object of the present invention to provide for an apparatus in which the last sound waves recorded at any time may be played back and repeated as desired without disturbing the setting of the structure of the conventional recording means.

It is yet another object of the present invention to provide for an apparatus in which different lengths of the last part of the record made can be repeated as desired.

It is a still further object of the present invention to provide for an apparatus which is made of relative few and simple parts can be made at reasonable cost and which will perform trouble-free over a long period of time.

With these objects in view the apparatus of the present invention mainly consists of an endless magnetic medium, recording and erasing means for recording sound waves on said endless magnetic medium and for erasing the record of the sound waves as said endless magnetic medium passes again through said record and erasing means so that only the latest sound waves recorded remain recorded on this endless medium. The apparatus comprises further a conventional recording structure for recording sound waves simultaneously with this means. The recording and erasing means is shiftable from recording to playing position and back, whereby when this means is in the playing position the latest sound waves recorded on the endles magnetic medium and the conventional recording structure can be played back from the endless magnetic medium while the conventional recording structure remains at standstill and undisturbed.

Instead of using a single endless magnetic medium for simultaneously recording thereon the latest sound waves which are recorded on the conventional recording structure, a plurality of endless magnetic mediums may be used which have, respectively, different recording lengths, and consequently, different recording and reproducing periods, so that end portions of different lengths recorded on the conventional recording structure may be played back from one of the endless magnetic mediums while the conventional recording structure and the other endless magnetic mediums remain at standstill.

The conventional recording structure comprises preferably an elongated magnetic medium for recording sound waves thereon and drive means are provided for selectively driving the elongated medium of the conventional recording structure and the endless magnetic medium. Coupling means are further provided for selectively coupling the drive means with the elongated and the endless magnetic mediums and for shifting the recording and erasing means coordinated with the endless magnetic medium from recording to playing position and back.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
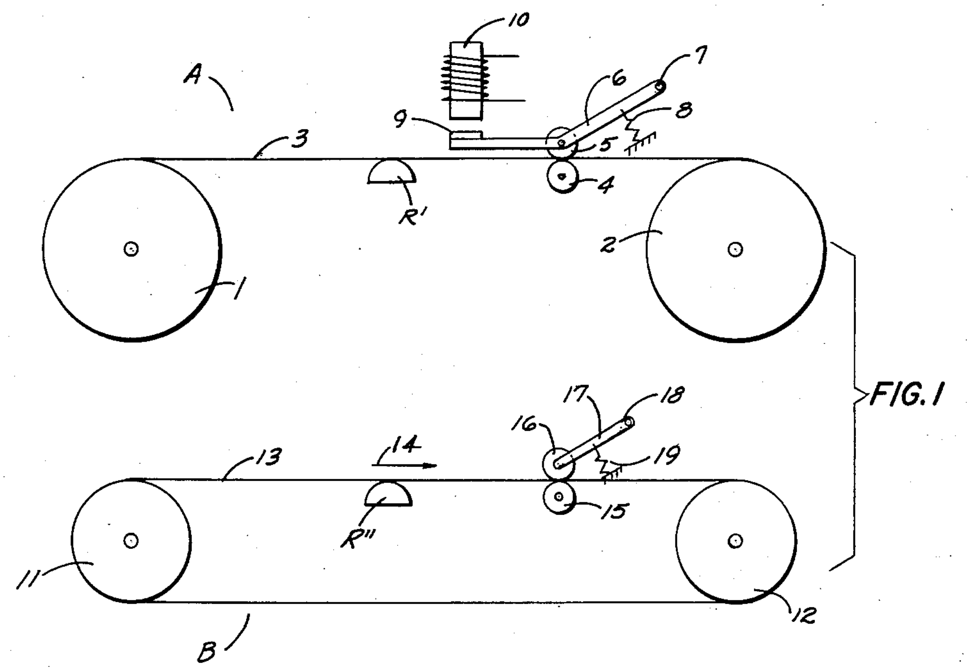
Fig. 1 is a schematic top view of the essential elements of an apparatus according to the present invention.

Referring now to the drawings, and more particularly to Fig. 1 it will be seen that the apparatus of the present invention mainly comprises a conventional recording structure A and a repeat addition B. The essential elements of the conventional recording structure A comprise, as shown in Fig. 1, a pair of spools 1 and 2 mounted for rotation on parallel shafts and an elongated magnetic medium 3 is wound on spool 1 and connected to spool 2 so as to be moved past a recording and erasing device R′ located between the spools 1 and 2 and in contact with the elongated magnetic medium 3. The elongated magnetic medium 3, which may have the form of a band or a wire as used in recording apparatus, is preferably driven by drive means, shown in the drawing as a pair of rollers 4 and 5. This kind of drive for the band or wire 3 is of conventional construction, well known in the art, and the roller 4 is driven with constant speed from an electric motor, not shown, whereas the roller 5 is mounted for turning movement on a swivel arm 6 pivoted at one end 7 on the support frame of the apparatus and pressed against the band or wire 3 by a spring 8. Thereby, the band or wire 3 is pressed against rotating drive roller 4 and the medium 3 is fed, as viewed in Fig. 1 from left to right and unwound from spool 1 onto spool 2. The spool 2 is preferably driven over gears and a slip clutch at the same time with the drive roller 4 and preferably from the same motor to provide for the proper winding of the medium 3 on the spool 2. The specific construction of this drive is well known in the art and does not form any part of the present invention and this drive is, therefore, not shown in the drawings. The lever 6 extends on its left side, as viewed in Fig. 1, beyond the circumference of the roller 5 and an armature 9 is mounted on this extension of the lever. An electromagnet 10 is fixedly mounted on the frame of the apparatus opposite the armature 9 and this electromagnet will, when energized, attract the armature 9 and tilt the lever 6 in clockwise direction against the force of the spring 8, moving thereby the pressure roller 5 out of contact with the medium 3 so that further movement of this medium 3 will stop. It is understood that the clutch connecting the shaft of spool 2 with the drive motor is disengaged at the same time so that rotation of the spool 2 stops at the same time as the pressure roller 5 is lifted out of contact with the medium 3.

The repeat addition B consists of a pair of spools 11 and 12 mounted for rotation about parallel axes and an endless magnetic medium 13 forming a single closed loop is wound about the spools 11 and 12. A recording and erasing head R″ is mounted, in contact with the endless magnetic medium 13, between spools 11 and 12. The endless magnetic medium is driven in the direction of the arrow 14 with the same linear speed as the medium 3 by the rollers 15 and 16, which form the drive means for the medium 13. Roller 15 is a constantly driven roller similar to roller 4 and roller 16 is a pressure roller turnably mounted on one end of lever 17 which in turn is mounted for tilting movement about its pivot 18 located on the other end of the lever. The lever is pressed by a spring 19, fixed at one end to the lever 17 and on the other end to the frame of the apparatus, against the endless band or wire 13 whereby this band or wire 13 is pressed against the drive roller 15 and is being driven in the direction of the arrow 14.

Figure 6:
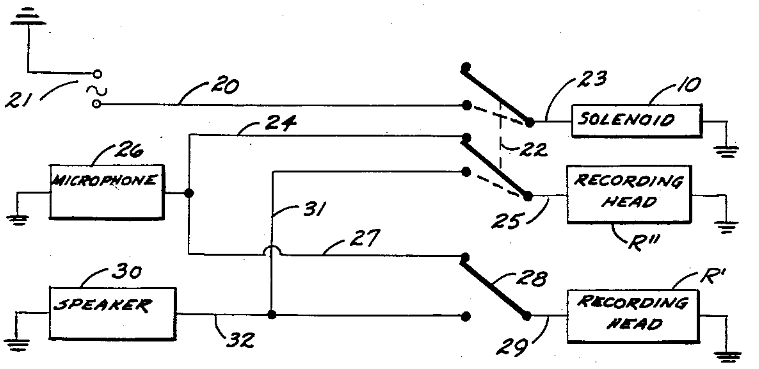
Fig. 6 is a simplified wiring diagram for the apparatus shown in Figs. 1–3.

The apparatus of the present invention comprises further the usual microphone and speaker or earphone and the electrical connections between the recording heads R′, R″, and the microphone and speaker, as well as the electrical connection of the solenoid 10 to the source of power are schematically shown in the simplified wiring diagram of Fig. 6. As shown therein, a conductor 20 leads from one contact of a source of power 21 to one pole of a double-pole, double-throw switch 22 and a conductor 23 leads from the other contact of this pole of switch 22 to the solenoid 10. The other contact of the source of power 21 and the solenoid 10 are shown grounded for simplication of the diagram. The other pole of the double-pole switch 22 is connected over the wires 24, 25 respectively to the microphone 26 and to the recording head R″ coordinated with the endless magnetic medium 13. The microphone 26 is also connected by means of the conductor 27 to one contact of the switch 28 and the pivoted end of switch 28 is connected by wire 29 to the recording head R′ coordinated with the elongated magnetic medium 3. The speaker or earphone 30 is connected by the wires 31 and 32 respectively to the second contact of the other pole of switch 22 and to the second contact of switch 28. The necessary amplifying circuits for the microphone and the speaker are not shown in the simplified wiring diagram of Fig. 6 in order not to complicate unnecessarily the diagram. In the positions of the switches 22 and 28 as shown in full lines in Fig. 6 both recording heads R′ and R″ are connected to the microphone so that sound waves may be simultaneously recorded by the recording heads R′ and R″ respectively on the elongated magnetic medium 3 and the endless magnetic medium 13 as the same are moved by the drive mechanism described above past the recording heads R′ and R″ and the solenoid 10 is deenergized. Switch 22 and solenoid 10 form coupling means for selectively coupling the drive means with the mediums 3 and 13 and for shifting head R″ from recording to playing position and back.

Figure 2:
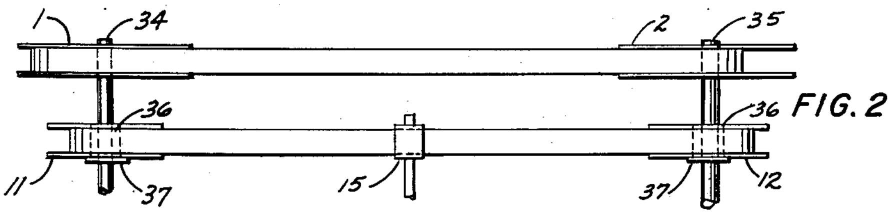
Fig. 2 is a side view of the essential elements of a modification of the apparatus of the present invention.
Figure 3:
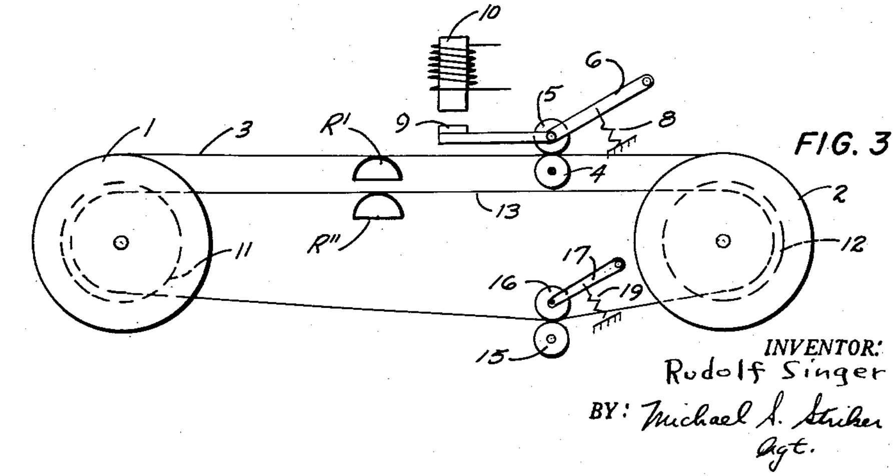
Fig. 3 is a schematic top view of the modification shown in Fig. 2.

In Fig. 1 the spools 1 and 2 of the conventional recording structure A and the spools 11 and 12 of the repeat addition B are shown mounted on separate parallel shafts and the repeat addition is laterally spaced from the conventional recording structure. Such a construction has its advantages if a repeat addition is added to a standard recording apparatus construction. A modification of the construction shown in Fig. 1 is shown in Figs. 2 and 3. In this modification the spools 1 and 2 of the conventional recording structure and the spools 11 and 12 of the repeat addition are respectively mounted below each other on two parallel shafts 34 and 35. The spools 1 and 2 are respectively fixed to the shafts 34, 35 so as to be driven thereby in a conventional manner, not forming part of the present invention, from a drive motor, whereas the spools 11 and 12 are mounted respectively on shafts 34 and 35 for free rotation relative thereto. Preferably anti-friction bearings, for instance, roller bearings 36, are located between the spool 11 and shaft 34 and between spool 12 and shaft 35, to assure free rotation of spools 11 and 12 on their respective shafts. The spools 11 and 12 are prevented from downward movement in axial direction by rings 37 fixed to the shafts 34, 35.

Except for the difference in mounting of the spools 11 and 12 the apparatus shown in Fig. 2 is the same as the apparatus described above in connection with Fig. 1. As shown in the schematic top view of Fig. 3, an elongated magnetic medium 3 is wound on spool 1 and moved by a drive roller 4 and pressure roller 5 past a recording and erasing device R′ onto the spool 2. An endless magnetic medium 13 is wound in form of a single loop about the rollers 11 and 12 and moved by the drive roller 15 and the pressure roller 16 past the recording and erasing head R″. The pressure roller 5 is normally pressed by the spring 8 acting on lever 6 against the band 3 and the pressure roller 5 may be lifted out of contact with the band 3 by the interaction of the electromagnet 10 with the armature 9 mounted on the extension of the lever 6. The pressure roller 16, on the other hand, is pressed into contact with the endless magnetic medium 13 by means of the spring 19 acting on the lever 17 on which roller 16 is mounted.

Figure 4:
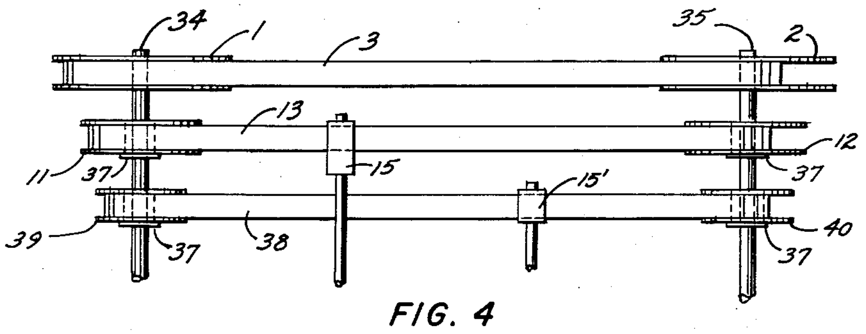
Fig. 4 is a side view of another modification.

A further modification of the present invention is shown in Fig. 4. In this apparatus two endless magnetic mediums 13 and 38 are provided. The endless magnetic medium 13 is wound in form of a single loop about spools 11 and 12 and the endless magnetic medium 38 is wound about spools 39, 40 having a smaller diameter than the spools 11 and 12. The medium 38 has therefore a length shorter than the medium 13. Since the magnetic mediums 13 and 38 have different recording lengths, they consequently have different recording and reproducing periods. Otherwise the construction of the apparatus shown in Fig. 4 is similar to the construction of the apparatus described in connection with Figs. 2 and 3. The shafts 34, 35 carry on their upper ends respectively the spools 1 and 2 with the elongated magnetic medium 3 and the elongated magnetic medium 3 is driven in the same way as described in connection with Figs. 2 and 3. The endless magnetic mediums 13 and 38 are driven in a similar manner as shown for the endless magnetic medium 13 in Fig. 3, but the pressure rollers coordinated to the drive rollers 15 and 15′ shown in Fig. 4 can be moved out of contact with the endless magnetic mediums 13 and 38 respectively by an electromagnet as described in connection with the drive mechanism for the band 3 shown in Fig. 3.

Figure 5:
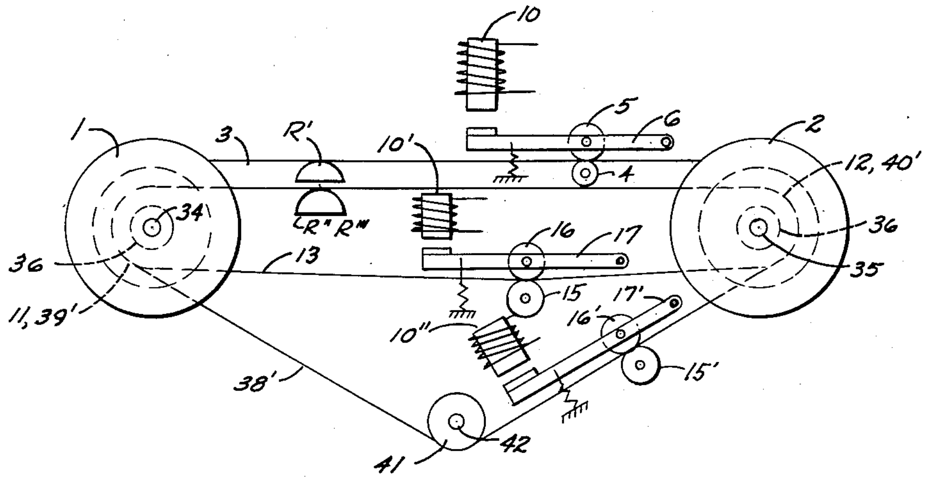
Fig. 5 is a schematic top view of yet another modification.

A further modification of the apparatus is illustrated in Fig. 5. The construction shown in a schematic top view is similar to the construction as shown in Fig. 4, that is, spools 1 and 2 of a conventional recording structure are mounted on the upper ends of parallel shafts 34, 35 and underneath these spools 1 and 2 are respectively located on shaft 34 spools 11 and 39′ and on shaft 35 spools 12 and 40′. The spools 11 and 39′ and the spools 12 and 40′ are respectively spaced in the longitudinal direction of shafts 34 and 35, and these spools are respectively mounted on the shafts for free rotation by anti-friction bearings 36 and held against longitudinal shifting on the shafts by rings 37 as previously described. However, in the modification shown in Fig. 5, the spools 11, 12, 39′ and 40′ have all the same diameters and the endless magnetic medium 13 is wound about the spools 11 and 12, whereas an endless magnetic medium 38′ forms a single loop about the spools 39′ and 40′ and a guide roller 41 turnably mounted on a shaft 42. Shaft 42 is parallel to shafts 34, 35 and located outside the loop formed by the band 13. As is evident from Fig. 5, the loop formed by the band 38′ is considerably longer than the loop formed by the band 13. A recording device R′ is located between spools 1 and 2 and cooperates with the elongated magnetic medium 3 for recording sound waves thereon and recording heads R″ and R‴ are respectively located between spools 11, 12 and 39′ and 40′, which recording heads respectively cooperate with the endless mediums 13 and 38′ for recording sound waves thereon. Each of the magnetic mediums 3, 13, and 38′ are driven by a drive mechanism as formerly described and as shown in Fig. 5. Electromagnets 10, 10′ and 10″ are respectively coordinated with the levers 6, 17 and 17′ on which the pressure rollers 5, 16 and 16′ are respectively mounted.

Figure 7:
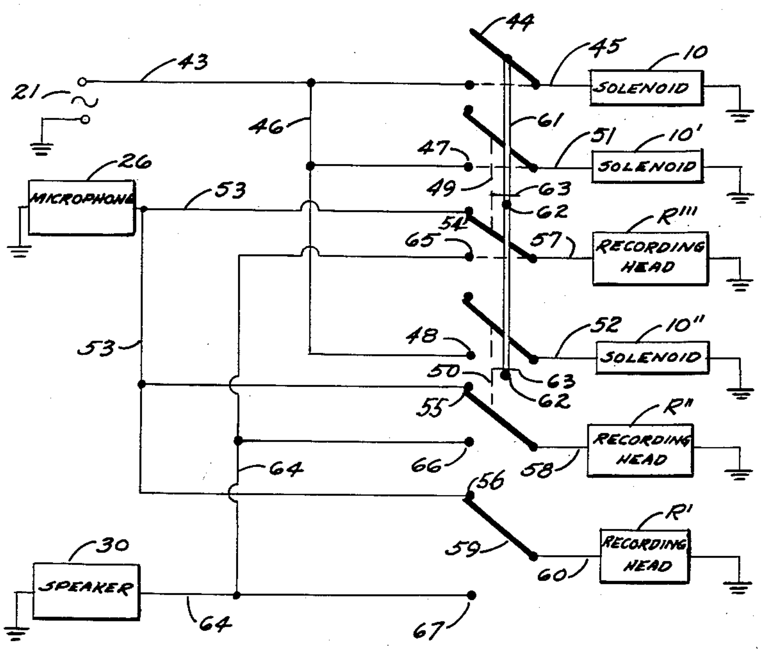
Fig. 7 is a simplified wiring diagram for the modifications shown in Figs. 4 and 5.

A simplified wiring diagram showing the connections of the recording heads R, R′, R″ and R‴ with the microphone and the speaker and the connections of the solenoids 10, 10′ and 10″ with a source of power is shown in Fig. 7. A conductor 43 leads from one contact of the source of energy 21 to one contact of the normally open single-pole switch 44 which is connected by a conductor 45 to the solenoid 10. A conductor 46 connected to conductor 43 leads to contacts 47, 48 respectively located at one pole of two double-pole double-throw switches 49, 50 and these poles of the switches 49 and 50 are respectively connected to solenoids 10′ and 10″ by wires 51 and 52. The microphone 26 is connected by conductors 53 to contacts 54, 55 and 56. Contact 54 is connected by means of the other pole of the double-pole switch 49 and conductor 57 to the recording head R‴, contact 55 is connected by means of the other pole of the double-pole switch 50 and conductor 58 to the recording head R″, and contact 56 is connected by the single-pole switch 59 and conductor 60 to the recording head R′. The switch 44 is connected to the switches 49 and 50 in such a manner that whenever one of the two later named switches is closed, switch 44 is simultaneously closed therewith. A simple mechanical linkage accomplishing this purpose is schematically illustrated in Fig. 7 and this linkage consists of a rod 61, guided by any conventional means for reciprocating movement in longitudinal direction, and connected to the blade of the switch 44. Two parallel pins 62 project substantially normally from rod 61 and two pins 63 project respectively from the tie rods of the switches 49 and 50. Pins 63 are arranged relative to pins 62 in such a way that closing one of the switches 49 or 50 will cause engagement of one of the pins 63 with one of the pins 62 so that the rod 61 is moved downwardly, as viewed in Fig. 7, and switch 44 will therefore be closed whenever one of the switches 49 or 50 is closed. Instead of the mechanical linkage just described, electrical relays may also be provided to close switch 44 whenever one of the switches 49 or 50 is closed. In the position shown in Fig. 7, the solenoids 10, 10′ and 10″ are de-energized and the recording heads R′, R″ and R‴ are all connected to the microphone 26.

The speaker or earphone 30 is connected by conductor 64 to three contacts 65, 66 and 67 which are arranged in such a way that throwing switch 49, from the position shown in full lines in Fig. 7 to the position shown in dotted lines, will shift the head R‴, cooperating with the band 38 or 38′ from recording to playing position, while energizing the solenoids 10 and 10′. On the other hand, when switch 50 is thrown, the head R″ is shifted from recording to playing position, while the solenoids 10 and 10″ are energized. Switch 59 may be used for shifting the recording device R′ from recording to playing position.

The apparatus as described will work as follows:

In the modifications illustrated in Figs. 1–3, the elongated magnetic medium 3 will be moved by the drive means described above past the recording and erasing device R′ and the endless magnetic medium 13 will be moved by the drive means described above past the recording and erasing head R″. The switches 22 and 28 are in the positions as shown in full lines in Fig. 6, that is the solenoid 10 is de-energized and the recording heads R′ and R″ are connected to the microphone. Any records existing on the mediums 3 and 13 are erased as these mediums respectively enter into the heads R′ and R″ and sound waves received by the microphone 26 are simultaneously recorded on the mediums 3 and 13 as they respectively leave the heads R′, R″. Therefore, the endless magnetic medium will always contain a record of the last sound waves recorded on the elongated medium 3. If the user of the apparatus wants to hear the last portion of the record made, the switch 22 is shifted from the position shown in full lines in Fig. 6 to the position shown in dotted lines in Fig. 6 and thereby the solenoid 10 is energized, whereby the armature 9 is attracted by the solenoid and the lever 6 is tilted in clockwise direction against the force of the spring 8. The pressure roller 5 is thereby lifted out of contact with the medium 3 and the drive of this medium is stopped. It is understood that any drive for spool 2 has to be disconnected from the same at the same time as the solenoid 10 is energized so that the spool 2 also stops rotating. The other pole of the switch 22 disconnects at the same time the recording head R″ from the microphone and connects this recording head to the speaker. The head R″ is thereby shifted from the recording to the playing position and since the drive for the endless magnetic medium 13 continues, the head R″ will repeat the record of the latest sound waves recorded on the endless magnetic medium 13 and the elongated magnetic medium 3 from the endless magnetic medium 13 while the elongated magnetic medium 3 remains at standstill.

In this way, the user of the apparatus, may play back the last portion of its record without disturbing the position of the elongated medium 3 and after returning the switch 22 to the position as shown in full lines in the diagram of Fig. 6, the dictation into the apparatus may be continued. A conventional drive may also be provided to drive spools 1 and 2 of the conventional recording structure in opposite direction and the switch 28 is provided to connect the recording head R′, also to the speaker 30 if it is desired to play back the record directly from the elongated medium 3.

With the modifications of the apparatus shown in the Figs. 4 and 5 and the wiring diagram of Fig. 7, it is possible to play back or repeat end portions of different lengths of the record and, depending on the length of the record the user wants to repeat, either the switch 49 or the switch 50 is moved from the position shown in full lines in Fig. 7 to the position shown in dotted lines. It will be seen that if the switch 49 is thus moved, the solenoid 10′ becomes energized and since closing of any of the switches 49 or 50 causes as described above also closing of switch 44, solenoid 10 becomes energized at the same time. Therefore, the drive for the elongated medium 3 and the endless medium 13 stops while the recording head R‴ coordinated to the endless medium 38′ is shifted from recording to playing position and thereby the end portion of the record is continuously repeated while the bands 3 and 13 remain at standstill. If the user of the apparatus wants to repeat a shorter portion of the end of the record, switch 50 is moved instead of the switch 49 whereby the solenoids 10 and 10″ are energized so that the mediums 3 and 38 or 38′ are stopped while the record head R″ is shifted from recording to playing position so that the last sound waves recorded are played back from the moving the endless medium 13.

It will be understood that each of the elements described above, or two or more together, may also find a useful application in other types of recording and reproducing apparatus differing from the types described above.

While the invention has been illustrated and described as embodied in a recording and a reproducing apparatus having a repeat addition, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A magnetic sound recording and reproducing apparatus comprising, in combination, a first pair of spools mounted for turning movement about parallel axes; a magnetic scanning and erasing device mounted between said spools of said first pair of spools; an elongated magnetic medium wound about one of the spools of said first pair of spools and adapted to be moved past said magnetic scanning device onto the other of said spools for recording sound waves thereon as the medium is moved past said first scanning device; at least a second pair of spools mounted for turning movement coaxially with said first pair of spools; a magnetic scanning and erasing head mounted between said spools of said second pair of spools, said erasing and scanning head being shiftable from recording to playing position and back; and an endless magnetic medium wound about said second pair of spools and movable past said scanning head for simultaneously recording said sound waves thereon, said sound waves being recorded, when said scanning head is in recording position, on the portion of the endless magnetic medium leaving said scanning and erasing head and the record of the sound waves being erased as said portion is re-entering said second scanning and erasing device, so that only the last sound waves recorded on said elongated magnetic medium remain always recorded on said endless magnetic medium, whereby when said second magnetic scanning and erasing device is in said playing position the latest sound waves recorded on said elongated and on said endless magnetic mediums can be played back from said endless magnetic medium while said elongated magnetic medium remains at standstill.

2. A magnetic sound recording and reproducing apparatus comprising, in combination, a first pair of spools mounted for turning movement about parallel axes; a magnetic scanning and erasing device mounted between said spools of said first pair of spools; an elongated magnetic medium wound about one of the spools of said first pair of spools and adapted to be moved past said magnetic scanning device onto the other of said spools for recording sound waves thereon as the medium is moved past said first scanning device; at least a second pair of spools mounted for turning movement coaxially with said first pair of spools; a magnetic scanning and erasing head mounted between said spools of said second pair of spools, said erasing and scanning head being shiftable from recording to playing position and back; an endless magnetic medium wound about said second pair of spools and movable past said scanning head for simultaneously recording said sound waves thereon, said sound waves being recorded, when said scanning head is in recording position, on the portion of the endless magnetic medium leaving said scanning and erasing head and the record of the sound waves being erased as said portion is re-entering said second scanning and erasing device, so that only the last sound waves recorded on said elongated magnetic medium remain always recorded on said endless magnetic medium; and drive means for selectively driving said elongated and said endless magnetic mediums with the same linear speed, whereby when said second magnetic scanning and erasing device is in said playing position the latest sound waves recorded on said elongated and on said endless magnetic mediums can be played back from said endless magnetic medium while said elongated magnetic medium remains at standstill.

3. A magnetic sound recording and reproducing apparatus comprising, in combination, a first pair of spools mounted for turning movement about parallel axes; a magnetic scanning and erasing device mounted between said spools of said first pair of spools; an elongated magnetic medium wound about one of the spools of said first pair of spools and adapted to be moved past said magnetic scanning device onto the other of said spools for recording sound waves thereon as the medium is moved past said first scanning device; at least a second pair of spools mounted for turning movement coaxially with said first pair of spools; a magnetic scanning and erasing head mounted between said spools of said second pair of spools, said erasing and scanning head being shiftable from recording to playing position and back; an endless magnetic medium wound about said second pair of spools and movable past said scanning head for simultaneously recording said sound waves thereon, said sound waves being recorded, when said scanning head is in recording position, on the portion of the endless magnetic medium leaving said scanning and erasing head and the record of the sound waves being erased as said portion is re-entering said second scanning and erasing device, so that only the last sound waves recorded on said elongated magnetic medium remain always recorded on said endless magnetic medium; drive means for selectively driving said elongated and said endless magnetic mediums with the same linear speed; and coupling means for selectively coupling said drive means with said elongated and endless mediums and for shifting said magnetic scanning and erasing head between said recording and playing positions, whereby when said second magnetic scanning and erasing device is in said playing position the latest sound waves recorded on said elongated and on said endless magnetic mediums can be played back from said endless magnetic medium while said elongated magnetic medium remains at standstill.

References Cited in the file of this patent

UNITED STATES PATENTS

| | | |
|---|---|---|
| 1,852,727 | Van der Horst | Apr. 5, 1932 |
| 2,029,730 | Mallina | Feb. 4, 1936 |
| 2,336,777 | Clausen | Dec. 14, 1943 |
| 2,750,575 | Doty et al. | June 12, 1956 |

FOREIGN PATENTS

| | | |
|---|---|---|
| 730,664 | Great Britain | May 25, 1955 |